US012246961B2

(12) United States Patent
Hejna et al.

(10) Patent No.: US 12,246,961 B2
(45) Date of Patent: Mar. 11, 2025

(54) CONTACTLESS DISPENSING VALVE SYSTEM

(71) Applicant: The Coca-Cola Company, Atlanta, GA (US)

(72) Inventors: Jason Franz Hejna, Atlanta, GA (US); Michael Lawrence Connor, Atlanta, GA (US); Steve C. Bacha, Buford, GA (US); Patrick Joseph May, Buford, GA (US); Ronald Loren Kraynick, Alpharetta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 177 days.

(21) Appl. No.: 17/906,917

(22) PCT Filed: May 12, 2021

(86) PCT No.: PCT/US2021/031898
§ 371 (c)(1),
(2) Date: Sep. 21, 2022

(87) PCT Pub. No.: WO2021/231516
PCT Pub. Date: Nov. 18, 2021

(65) Prior Publication Data

US 2023/0139954 A1 May 4, 2023

Related U.S. Application Data

(60) Provisional application No. 63/024,090, filed on May 13, 2020.

(51) Int. Cl.
*B67D 1/08* (2006.01)
*B67D 1/00* (2006.01)

(52) U.S. Cl.
CPC ......... *B67D 1/0888* (2013.01); *B67D 1/0036* (2013.01)

(58) Field of Classification Search
CPC ...... B67D 1/0888; B67D 1/0036; B67D 1/24; B67D 1/0057
See application file for complete search history.

(56) References Cited

U.S. PATENT DOCUMENTS

| | | | | |
|---|---|---|---|---|
| 4,440,200 A | | 4/1984 | Devale et al. | |
| 6,082,419 A | * | 7/2000 | Skell | B67D 1/1236 141/351 |

(Continued)

FOREIGN PATENT DOCUMENTS

| | | | |
|---|---|---|---|
| EP | 2006623 A2 | 12/2008 | |
| JP | 2007-261621 A | 10/2007 | |

(Continued)

OTHER PUBLICATIONS

International Search Report and Written Opinion for PCT/US2021/031898, dated Aug. 23, 2021 (7 pp.).

*Primary Examiner* — Vishal Pancholi
(74) *Attorney, Agent, or Firm* — Eversheds Sutherland (US) LLP

(57) ABSTRACT

The present application provides a beverage dispenser for dispensing a beverage in a contactless fashion. The beverage dispenser may include a number of adjacent dispensing valves with each of the dispensing valves including a nozzle and a contactless dispensing valve system. The contactless dispensing valve system includes one or more proximity sensors positioned under the nozzle of each of the adjacent dispensing valves.

14 Claims, 5 Drawing Sheets

(56) References Cited

U.S. PATENT DOCUMENTS

| | | | | |
|---|---|---|---|---|
| 6,688,134 | B2 | 2/2004 | Barton et al. | |
| 8,353,321 | B2 | 1/2013 | Agam et al. | |
| 8,534,501 | B2 * | 9/2013 | Nevarez | A23G 9/224<br>222/105 |
| 9,828,228 | B2 * | 11/2017 | Chase | B67D 1/0878 |
| 9,957,147 | B2 * | 5/2018 | Ka | B67D 1/0004 |
| 2003/0089423 | A1 * | 5/2003 | Barton | B67D 1/0888<br>141/198 |
| 2007/0227619 | A1 * | 10/2007 | Shiraishi | B67D 1/0034<br>141/95 |
| 2020/0134960 | A1 | 4/2020 | Kingston et al. | |

FOREIGN PATENT DOCUMENTS

| | | | |
|---|---|---|---|
| KR | 10-1897572 | B1 | 10/2018 |
| WO | 03-042612 | A2 | 5/2003 |

* cited by examiner

Ultrasonic Sensor

Infrared Sensor

Capacitance Proximity Sensor

CONTACTLESS DISPENSING VALVE SYSTEM

TECHNICAL FIELD

The present application and the resultant patent relate generally to beverage dispensing systems and more particularly relate to a contactless dispensing valve system for automatically detecting and filing containers with beverages and the like.

BACKGROUND OF THE INVENTION

Generally described, conventional beverage dispensing systems may initiate a dispense or a pour in response to a consumer pushing an activation button or pushing a cup against an activation lever. In either scenario, the consumer or the consumer's cup must come into physical contact with the beverage dispenser. For the purpose of good hygiene, many consumers may prefer to avoid as much physical contact as practical while still being able to carry on with daily activities. The consumer thus may seek to limit the number of physical contact points.

There is thus a desire for an improved beverage dispensing system that may initiate a dispense or a pour without physical contact therewith. Such an improved beverage dispensing system may initiate such a dispense or a pour for any conventionally sized container.

SUMMARY OF THE INVENTION

The present application and the resultant patent thus provide a beverage dispenser for dispensing a beverage in a contactless fashion. The beverage dispenser may include a number of adjacent dispensing valves with each of the dispensing valves including a nozzle and a contactless dispensing valve system. The contactless dispensing valve system includes one or more proximity sensors positioned under the nozzle of each of the adjacent dispensing valves.

The present application and the resultant patent further provide a method of contactless dispensing of a beverage into a container positioned about a nozzle of a multi-nozzle beverage dispenser. The method may include the steps of positioning a number of sensors perpendicularly to the nozzle, continually sensing a distance from the sensors to the container, determining if the distance is within a threshold value, and if so, dispensing the beverage into the container.

These and other features and improvements of the present application and the resultant patent will become apparent to one of ordinary skill in the art upon review of the following detailed description when taken in conjunction with the shown drawings and the appended claims.

DETAILED DESCRIPTION

Figure 1:
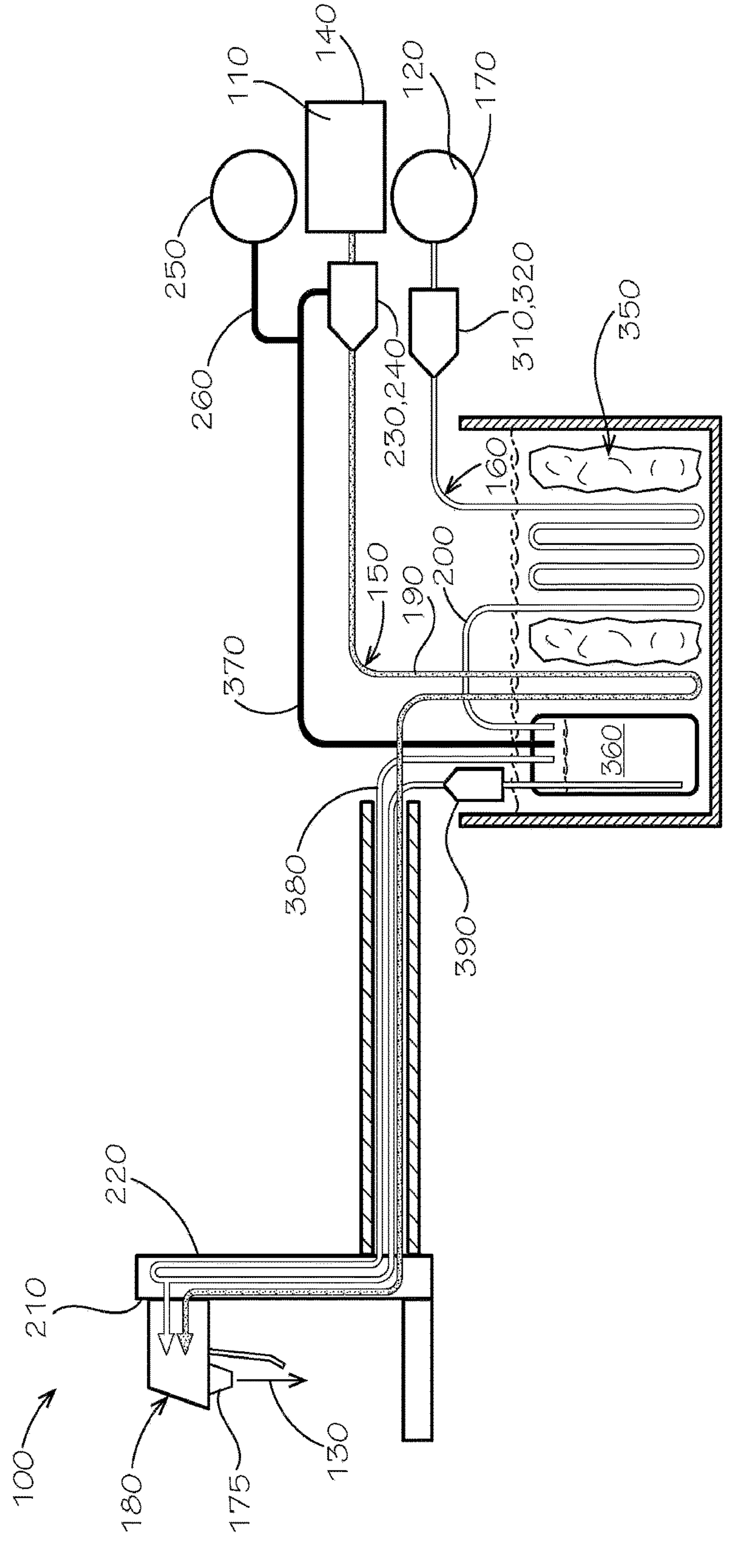
FIG. 1 is a schematic diagram of a beverage dispenser as may be described herein.
Figure 2:
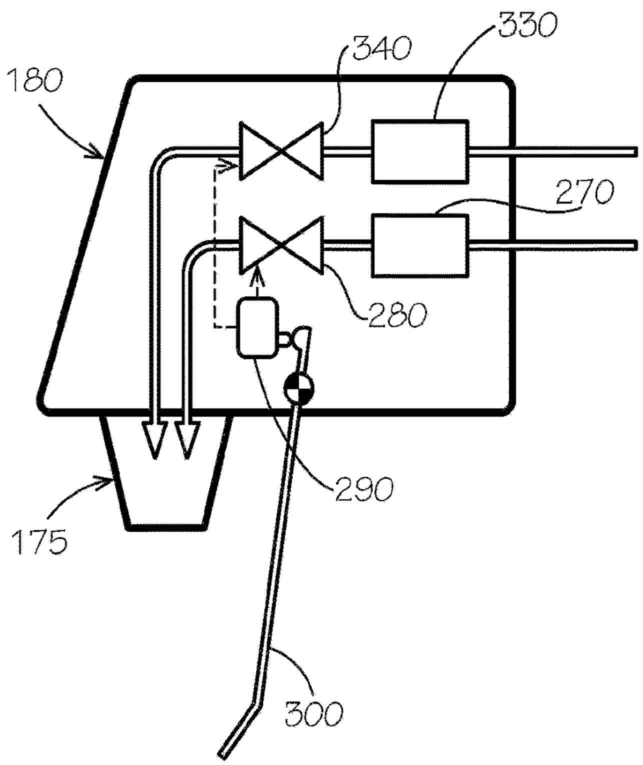
FIG. 2 is a schematic diagram of a dispensing valve of the beverage dispenser of FIG. 1.

Referring now to the drawings, in which like numerals refer to like elements throughout the several views, FIG. 1 shows a schematic diagram of a beverage dispenser 100 as may be described herein. Generally described, the beverage dispenser 100 may mix a number of fluids such as one or more syrups 110 and one or more diluents 120 to form any number of different beverages 130. Other types of fluids such as flavor additives and other types of ingredients also may be used herein. Any number of fluids may be mixed herein in any volume or order. The dispensed beverages 130 may be chilled, heated, or at any temperature. The dispensed beverages 130 may flow into a consumer's cup 135 or other type of container.

The syrups 110 or other ingredients may be stored in a number of ingredient containers 140. The ingredient containers 140 may be conventional five gallon bag-in-box containers or other type of container. The ingredient containers 140 may be positioned within, adjacent to, or remote from the beverage dispenser 100. Different types of containers also may be used herein.

The beverage dispenser 100 may have one or more syrup circuits 150 in communication with each ingredient contain 140. Likewise, the beverage dispenser 100 may have one or more diluent circuits 160 in communication one or more diluent sources 170. Any number of syrup circuits 150 and diluent circuits 160 may be used herein. Flavoring or additive circuits and the like also may be used.

Each syrup circuit 150 may extend from one of the ingredient containers 140 to a nozzle 175 of a dispensing valve 180 via a syrup line 190. Likewise, each diluent circuit 160 may extend from one of the diluent sources 170 to the nozzle 175 of the dispensing valve 180 via a diluent line 200. The syrup lines 190 and the diluent lines 200 may be made from, for example, food grade thermoplastics and the like. Any number of the dispensing valves 180 may be used herein. Each dispensing valve 180 may be positioned on, for example, a backboard 210 of a dispensing tower 220. Other positions and other types of equipment may be used herein.

Each syrup circuit 150 may have a syrup pump 230 thereon. By way of example, the syrup pump 230 may be a conventional carbon dioxide, powered on demand pump 240 and the like. The carbon dioxide, powered on demand pump 240 may be powered by a flow of pressurized carbon dioxide from a carbon dioxide source 250 via a carbon dioxide line 260. The carbon dioxide source 250 may be any type of conventional pressurized container and the like. Other types of syrup pumps 230 and fluid movement devices may be used herein.

The syrup pump 230 may pump the syrup through the syrup line 190 to the dispensing valve 180. The dispensing valve 180 may have a syrup flow controller 270 and a syrup solenoid valve 280 therein. The syrup flow controller 270 may be a mechanical device with a fixed flow rate therethrough. The flow rate may be adjusted manually as desired. The syrup solenoid valve 280 may be an on/off type device. The syrup solenoid valve 280 may include an on/off switch 290. The on/off switch 290 may be operated by an activation lever 300 attached to the dispensing valve 180. A consumer thus can operate the syrup circuit 150 of the dispensing valve 180 by pushing his or her cup against the actuation lever 300 to begin a flow therethrough.

Likewise, each diluent circuit 150 may have a diluent pump 310 thereon. By way of example, the diluent pump 310 may be a positive displacement pump 320 and the like. The positive displacement pump 320 may be a vibration pump, a solenoid pump, a gear pump, an annular pump, a peristaltic pump, a syringe pump, a piezo pump, or any other type of positive displacement device that is designed to pump a fixed displacement of fluid for each pump cycle. Other types of diluent pumps 310 and fluid movement devices may be used herein. The diluent pump 310 may pump the diluent through the diluent line 200 to the dispensing valve 180. The dispensing valve 180 may have a diluent flow controller 330 and a diluent solenoid valve 340 therein. The diluent flow controller 330 and the diluent solenoid valve 340 may be similar to the syrup flow devices described above. Given such, the consumer thus can operate the diluent circuit 160 of the dispensing valve 180 by pushing his or her cup against the actuation lever 300 to begin a flow therethrough.

The beverage dispenser 100 also may include an ice chamber 350. The ice chamber 350 may be of conventional design and may have any suitable size, shape, or configuration. The ice chamber 350 may be filled with a volume of ice and water and/or the ice chamber 350 may have a number of cooling coils (not shown) therein so as to promote the growth of an ice bank therein. The syrup lines 190 and the diluent lines 200 may extend therethrough so as to chill the fluids flowing therethrough. Other components and other configurations may be used herein.

The beverage dispenser 100 may have a carbonator 360 positioned in or near the ice chamber 350. The carbonator 360 may be of conventional design. The carbonator 360 may take a flow of diluent from the diluent line 200 and a flow of carbon dioxide from the carbon dioxide source 250 via a carbonator carbon dioxide line 370. The diluent and the carbon dioxide mix with in the carbonator 360 to create carbonated water. The carbonated water then may flow to the dispensing valve 190. The beverage dispenser 100 also may have a carbonated water recirculation circuit 380 with a recirculation pump 390 so as to recirculate the diluent so as to maintain the diluent at an appropriate chilled temperature. Although the diluent circuit 160 shown is a carbonated water circuit, one or more plain water circuits also may be used that bypass the carbonator 360. Depending on the distance between the dispensing valve 180 and the ice chamber 350, the syrup lines 190 and the diluent lines 200 may run through an extended insulated "python" 395 so as to maintain the fluids therein at the appropriate temperature. Other components and other configurations may be used herein.

Figure 3:
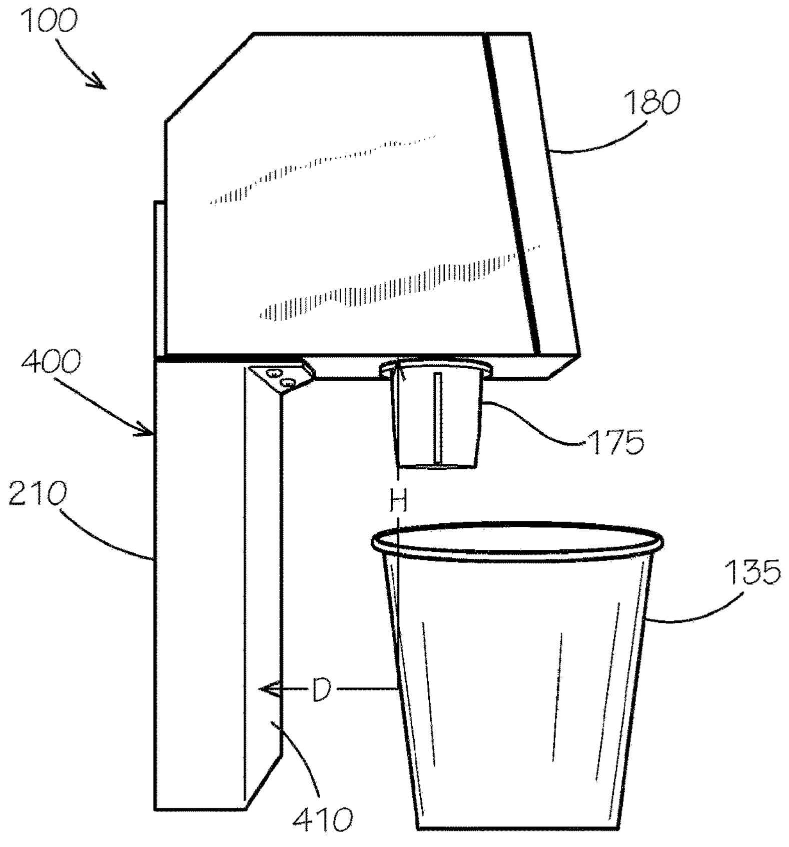
FIG. 3 is a side view of a portion of a beverage dispenser with a contactless dispensing valve system as may be described herein.
Figure 4:
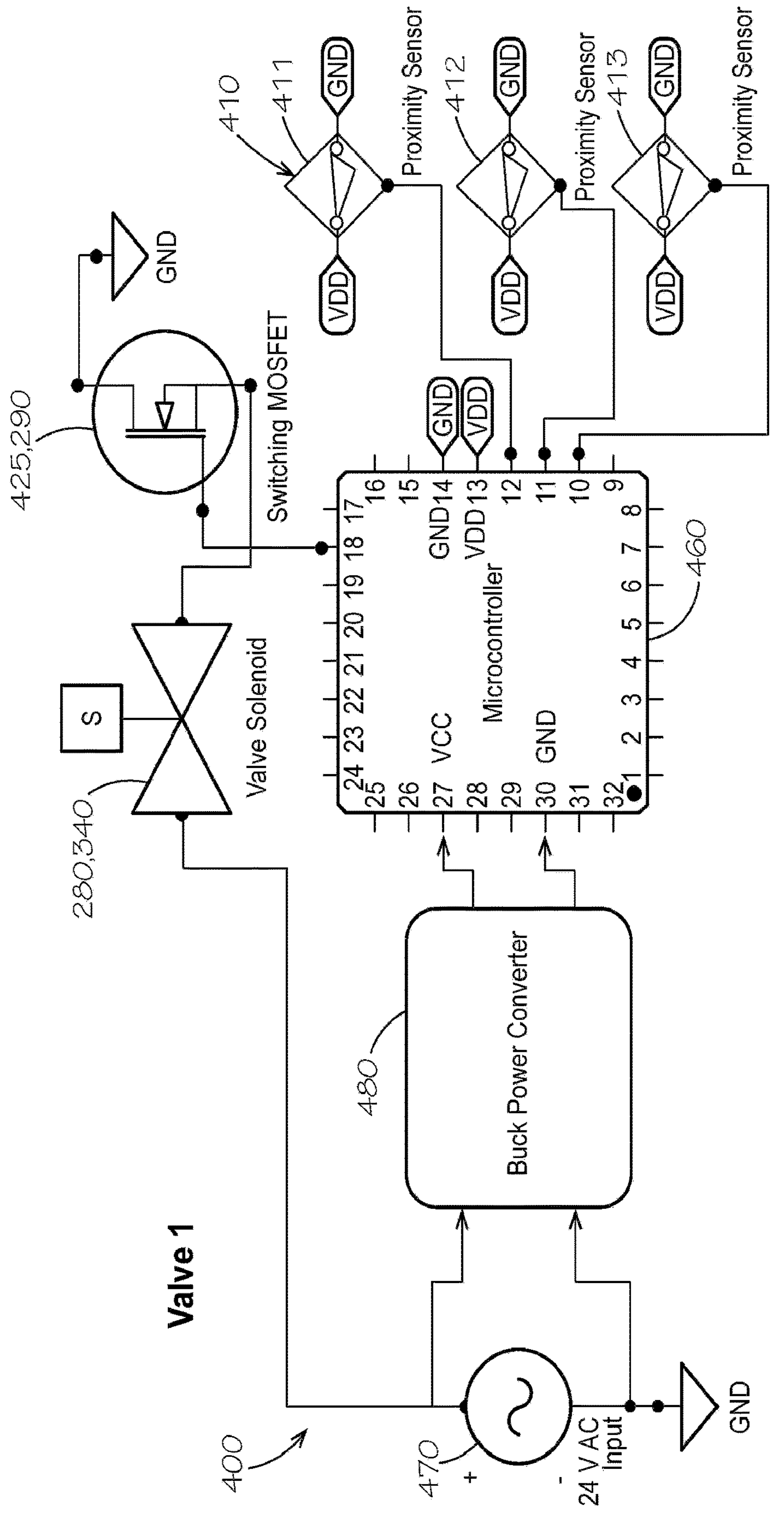
FIG. 4 is a schematic diagram of the contactless dispensing valve system of FIG. 3.
Figure 5A:
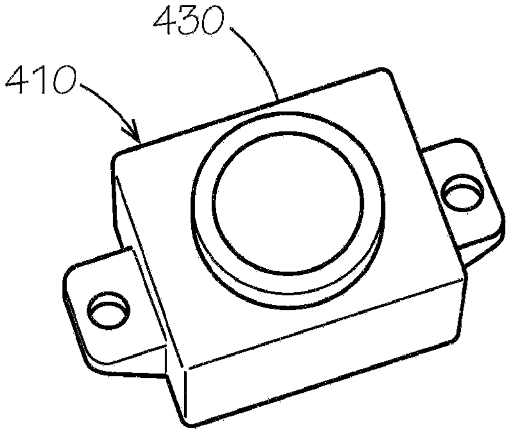
FIGS. 5A-5C show embodiments of a proximity sensor of the contactless dispensing valve system on FIG. 3.
Figure 5B:
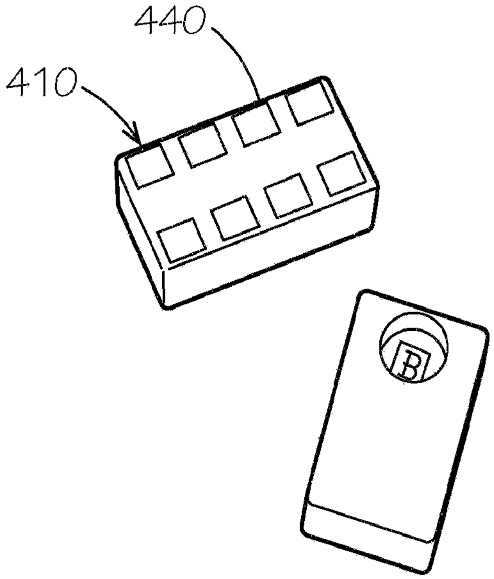
Figure 5C:
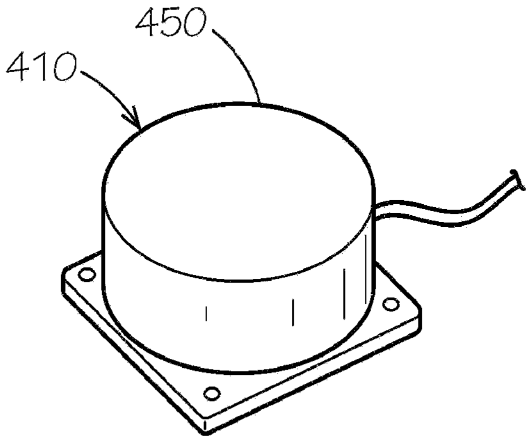

FIGS. 3 and 4 show a contactless dispensing valve system 400 that may be used with the beverage dispenser 100. Instead of using the lever 300, the contactless dispensing valve system 400 may include one or more proximity sensors 410 and a control circuit 420 in communication with the syrup solenoid valve 280 and the diluent solenoid valve 340 via the on/off switch 290. The proximity sensors 410 may include an ultrasonic sensor 430 (FIG. 5A), an infrared sensor 440 (FIG. 5B), a capacitance proximity sensor 450 (FIG. 5C), or similar types of sensors. Different types of sensors may be used together. In this example, three proximity sensors 410 are shown, a first proximity sensor 411, a second proximity sensor 412, and a third proximity sensor 413. Any number of the proximity sensors 410 may be used. The proximity sensors 410 may be positioned on the backboard 210 or in similar positions that may be substantially perpendicular to the flow of the beverage 130 from the nozzle 175. A middle position along the backboard 210 may be preferred in the proximity sensors 410 may miss detecting the cup 135 if the proximity sensors 410 are positioned too high or too low with respect to the nozzle 175. In this example, the on/off switch 290 may be in the form of a MOSFET (Metal Oxide Semiconductor Field Effect Transistor) switch 425. The MOSFET switch 425 is a semiconductor device used for switching and amplifying electronic signals. Alternatively, a TRIAC (Triode AC Switch) also may be used. A Triac is a high-speed solid-state device that can switch and control AC power in both directions of a sinusoidal waveform. Other types of on/off switches may be used herein. Other components and other configurations may be used herein.

The control circuit 420 includes a microcontroller 460. The micro-controller 460 may be any type of programmable logic device. The microcontroller 460 may be local or remote. Multiple microcontrollers 460 may be used herein. The microcontroller 460 may execute computer-executable program instructions. The computer executable program instructions may include any number of module application programs required to operate the contactless dispensing valve system 100. Examples include, but are not limited to, a MOTOROLA, MICROCHIP, RABBIT, ZILOG, or other manufacturers or brands, as may be required and/or desired in a particular embodiment. The microcontroller 460 may be powered via an AC power source 470 via a buck power converter 480 and the like. Other component and other configurations may be used herein.

Each of the different proximity sensors 410 have different advantages and drawbacks. The advantages of the ultrasonic sensor 430 include the ability to function in a harsh environment with high accuracy. The drawbacks include a relatively large size, high cost, and low time-of-flight accuracy at extremely close distances. The advantages of the infrared sensor 440 or infrared time of flight sensor include a low relative cost, high accuracy, and small relative sensor size. The drawbacks include possible interference issues and the ability to function in harsh environments. For example, droplets of soda that get on the lens of the sensor could cause the sensor to malfunction. The advantages of the capacitance proximity sensor 450 include the ability to function in a harsh environment, cost, and low potential for interference with adjacent sensors. The drawbacks include calibration in production, a relatively large sensor size, and the lower accuracy of distance measurements when compared to time-of-flight sensors.

Figure 6:
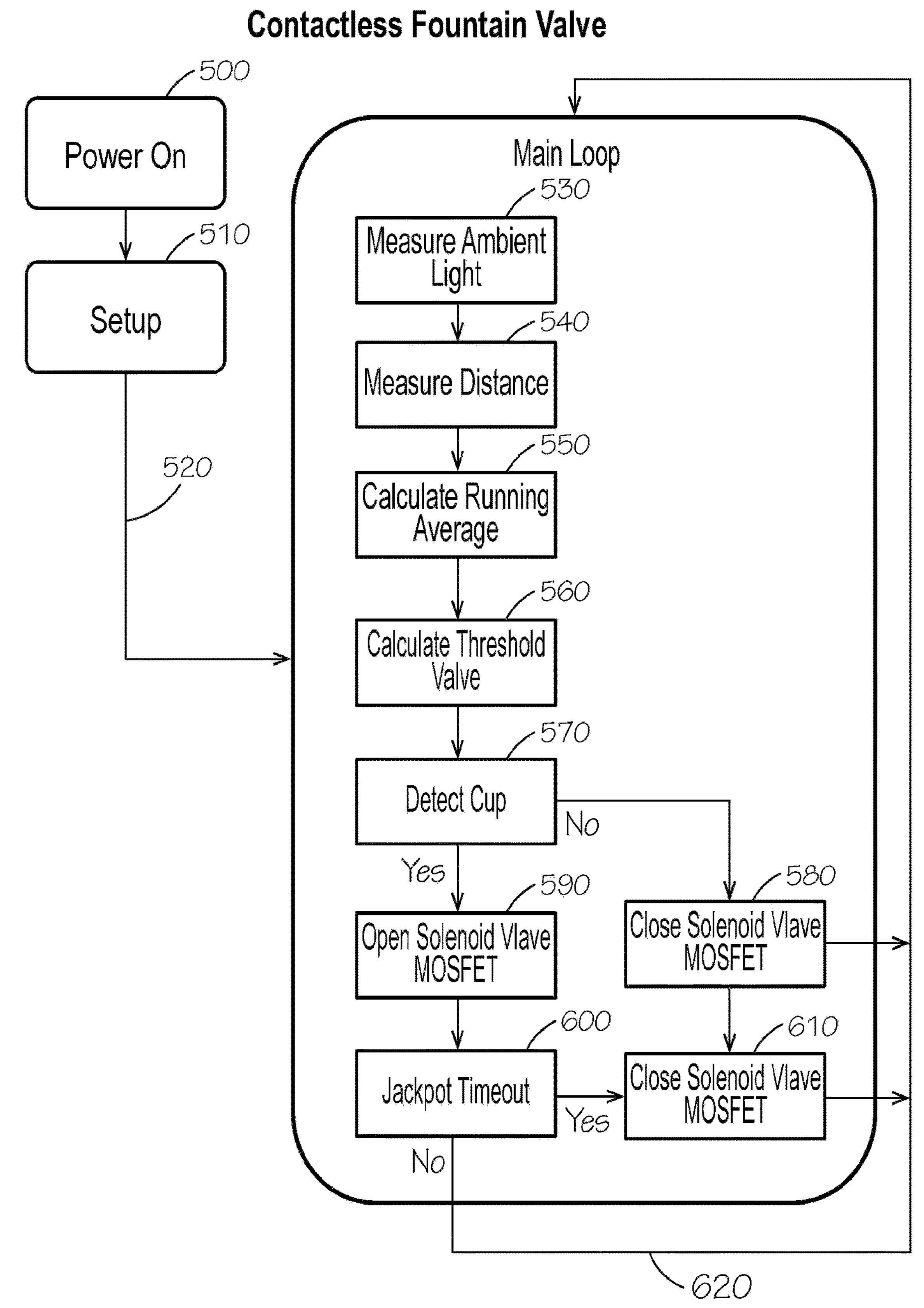
FIG. 6 is a flow chart showing exemplary operating steps for the contactless dispensing valve system of FIG. 3.

FIG. 6 is a flow chart of exemplary steps in the operation of the contactless valve system 100. At step 500, the contactless dispensing valve system 100 is powered on and setup is initialized at step 510. At step 520, the contactless dispensing valve system 100 enters the main operation loop. At step 530, ambient light is measured by one of the proximity sensors 410 (either the ultrasonic sensor 430 or the capacitance sensor 450). The ambient light measurements prevent false positives caused by, for example, turning on the lights in a restaurant. At step 540, the distance (D) from the proximity sensors 410 to the cup 135 is continuously measured. At step 550, the running average of the distance is calculated. At step 560, a threshold value is calculated. The distance reading averages are used to discard a distance reading greater than the threshold value. At step 570, a determination is made of whether a cup 135 is present. If a determination is made that no cup is present, at step 580 the MOSFET switch 425 remains closed. If a determination is made that a cup is present, at step 590 the MOSFET switch 425 is opened. Opening the MOSFET switch 425 in turn opens the syrup solenoid valve 280 and the diluent solenoid valve 340 such that the beverage 130 flows into the cup 135. At step 600, a determination is reach as to whether a total pouring time has reached a "jackpot" level or a maximum fill level. If so, the MOSFET switch 425 is closed at step 610. If not, the main loop continues at step 620 until the jackpot level is reached. As described above, a TRIAC also may be used herein.

Similarly, the contactless valve system 100 may accommodate cups 135 of differing heights. If the cup 135 is tapered from top to bottom, the taper may be used to determine the fill height H. Specifically, if the distance D to the cup 135 is less than a threshold value at a lower end of the cup 135 and the distance D to the cup is greater than the threshold value at an upper end of the cup 135, a typical fill time between these levels may be used as the jackpot level. These method step are exemplary only. Other and different method steps may be used herein in any order.

Interference between adjacent dispensing valves 180 may be avoided by adjusting the parameters of the proximity sensors 410. Each of the proximity sensors 410 may have a field of view of no more than about thirty degrees. Moreover, the proximity sensors 410 on adjacent dispensing valves 180 may use differently times light pulses. Specifically, each proximity sensor 410 may use a timing that is randomly generated at the startup step 510. Each proximity sensor 410 thus may only look for incoming light pulses at that timing interval so as to avoid interference with adjacent dispensing valves 180.

The contactless dispensing valve system 400 thus allows contactless dispensing of beverages and the like. The proximity sensors 410 accurately determine the presence of a cup 135 with minimal interference from adjacent dispensing valves 180 and with minimal cleaning requirements.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A beverage dispenser for dispensing a beverage in a contactless fashion, comprising:

a plurality of adjacent dispensing valves;

each of the plurality of dispensing valves comprising a nozzle; and a contactless dispensing valve system;

the contactless dispensing valve system comprising one or more proximity sensors positioned under the nozzle of each of the plurality of adjacent dispensing valves;

wherein the one or more proximity sensors for each adjacent dispensing valve comprise differently timed light pulses.

2. The beverage dispenser of claim 1, wherein the one or more proximity sensors for each adjacent dispensing valve comprise a field of vision of less than about thirty degrees.

3. The beverage dispenser of claim 1, wherein each of the plurality of adjacent dispensing valves comprises a syrup circuit and a diluent circuit in communication with the nozzle.

4. The beverage dispenser of claim 3, wherein the syrup circuit comprises a syrup valve, the diluent circuit comprises a diluent valve, and wherein the contactless dispensing valve system comprises an on/off switch in communication with the syrup valve and the diluent valve.

5. The beverage dispenser of claim 4, wherein the on/off switch comprises a metal oxide semiconductor field effect transistor switch or a triode AC switch.

6. The beverage dispenser of claim 4 wherein the contactless dispensing valve system comprises a microcontroller in communication with the one or more proximity sensors and the on/off switch.

7. The beverage dispenser of claim 6, wherein contactless dispensing valve system comprises an AC power source and a power converter in communication with the microcontroller.

8. The beverage dispenser of claim 1, wherein the one or more proximity sensors comprises an ultrasonic sensor.

9. The beverage dispenser of claim 1, wherein the one or more proximity sensors comprises an infrared sensor.

10. The beverage dispenser of claim 1, wherein the one or more proximity sensors comprises a capacitance proximity sensor.

11. The beverage dispenser of claim 1, wherein the one or more proximity sensors positioned under the nozzle of each of the plurality of adjacent dispensing valves comprise a plurality of proximity sensors positioned on a backboard of the beverage dispenser.

12. The beverage dispenser of claim 1, wherein the one or more proximity sensors positioned under the nozzle of each of the plurality of adjacent dispensing valves comprise a plurality of proximity sensors positioned perpendicularly to the nozzle.

13. The beverage dispenser of claim 1, wherein the one or more proximity sensors positioned under the nozzle of each of the plurality of adjacent dispensing valves comprise three proximity sensors.

14. A method of contactless dispensing of a beverage into a container positioned about a nozzle of a multi-nozzle beverage dispenser, comprising:

positioning a plurality of sensors perpendicularly to the nozzle;

continually sensing a distance from the plurality of sensors to the container;

determining if the distance is within a threshold value; and if so, dispensing the beverage into the container.

* * * * *